(12) United States Patent
Anand

(10) Patent No.: US 10,965,805 B1
(45) Date of Patent: Mar. 30, 2021

(54) CONTEXTUAL AWARENESS DETERMINATION FOR A MOBILE DEVICE

(71) Applicant: Charter Communications Operating, LLC, St. Louis, MO (US)

(72) Inventor: Mohit Anand, Centennial, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/852,779

(22) Filed: Apr. 20, 2020

(51) Int. Cl.
*H04M 1/725* (2021.01)
*G06F 16/51* (2019.01)
*G06K 9/00* (2006.01)
*G06K 9/62* (2006.01)
*H04W 48/18* (2009.01)
*H04W 52/02* (2009.01)

(52) U.S. Cl.
CPC ........ *H04M 1/72569* (2013.01); *G06F 16/51* (2019.01); *G06K 9/00664* (2013.01); *G06K 9/6202* (2013.01); *H04W 48/18* (2013.01); *H04W 52/027* (2013.01); *H04W 52/028* (2013.01); *H04W 52/0264* (2013.01); *H04M 2250/12* (2013.01); *H04M 2250/52* (2013.01)

(58) Field of Classification Search
CPC ......... H04M 1/72569; H04M 2250/52; H04M 2250/12; G06K 9/6202; G06K 9/00664; H04W 52/027; H04W 48/18; H04W 52/0264; H04W 52/028; G06F 16/51
See application file for complete search history.

(56) References Cited

U.S. PATENT DOCUMENTS

| 2009/0170532 A1* | 7/2009 | Lee .................. H04M 1/72569 455/456.3 |
| 2014/0128021 A1 | 5/2014 | Walker et al. |
| 2015/0286894 A1* | 10/2015 | Cho ..................... H04N 21/278 382/201 |
| 2019/0364492 A1* | 11/2019 | Azizi ................... H04W 4/029 |

* cited by examiner

*Primary Examiner* — Minjung Kim
(74) *Attorney, Agent, or Firm* — Young Basile Hanlon & MacFarlane, P.C.

(57) ABSTRACT

Disclosed herein are methods and systems determining contextual awareness for a mobile device and adjusting settings based on the contextual awareness determination. A method for determining an environmental context for a mobile device includes capturing, by one or more non-intrusive sensors on a mobile device, sensor data associated with the one or more non-intrusive sensors, where global positioning system sensor data is unavailable, generating, by the mobile device, a sensor data attribute from each captured sensor data, determining, by the mobile device, an environmental context for the mobile device from the sensor data attribute, and adjusting, by the mobile device, settings on the mobile device based on the determined environmental context.

19 Claims, 3 Drawing Sheets

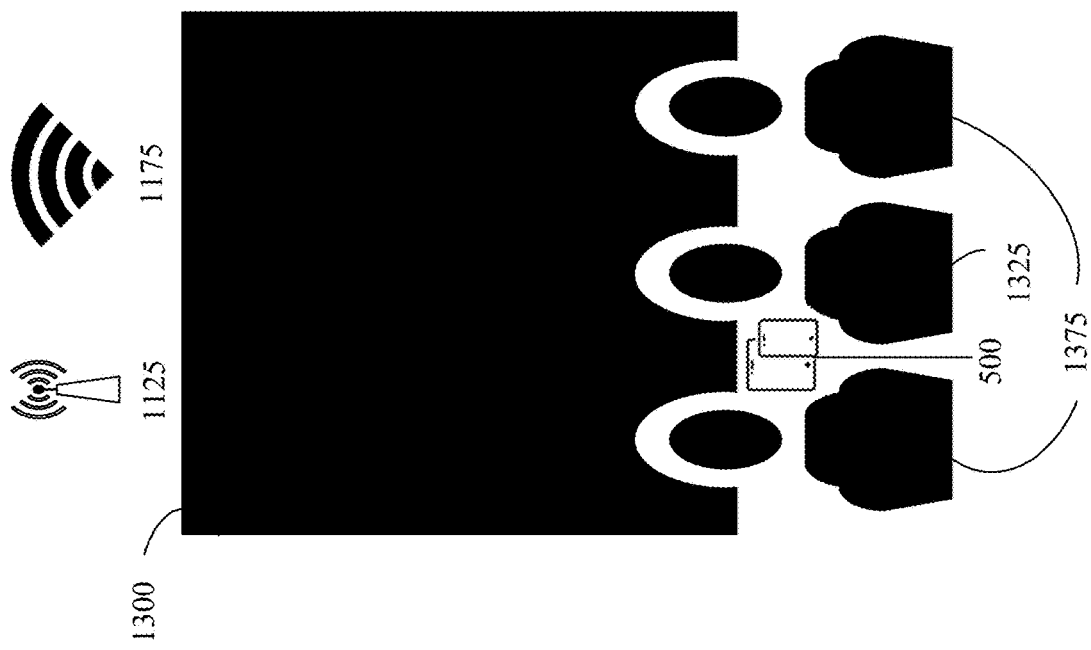
FIG. 1C
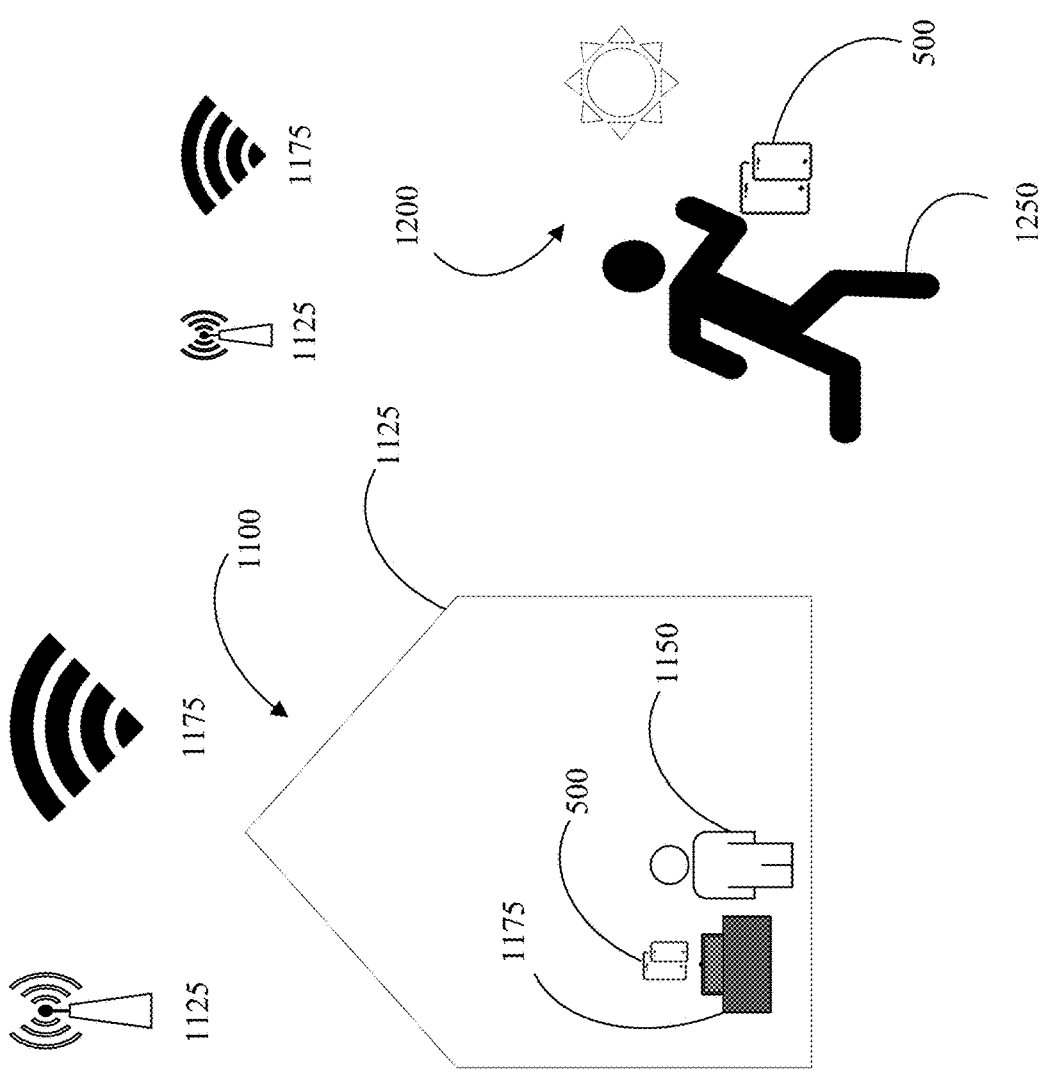
FIG. 1B
FIG. 1A

CONTEXTUAL AWARENESS DETERMINATION FOR A MOBILE DEVICE

TECHNICAL FIELD

This disclosure relates to mobile devices. More specifically, this disclosure relates to methods for determining contextual awareness for a mobile device and adjusting settings based on the contextual awareness determination.

BACKGROUND

Mobile devices use a global positioning system (GPS) tracking system to determine the location of the mobile device. The GPS tracking system depends on the reception of radio frequency (RF) signals which are dependent on weather, environment, proximity to base stations or cell tower, and other reception hampering conditions. In addition, there are privacy concerns related to GPS tracking and location accessibility by others.

SUMMARY

Disclosed herein are methods and systems determining contextual awareness for a mobile device and adjusting settings based on the contextual awareness determination. In implementations, a method for determining an environmental context for a mobile device includes capturing, by one or more non-intrusive sensors on a mobile device, sensor data associated with the one or more non-intrusive sensors, where global positioning system sensor data is unavailable, generating, by the mobile device, a sensor data attribute from each captured sensor data, determining, by the mobile device, an environmental context for the mobile device from the sensor data attribute, and adjusting, by the mobile device, settings on the mobile device based on the determined environmental context.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIGS. 1A, 1B, and 1C are diagrams of examples of different environments for use of a mobile device in accordance with embodiments of this disclosure.

DETAILED DESCRIPTION

Figure 2:
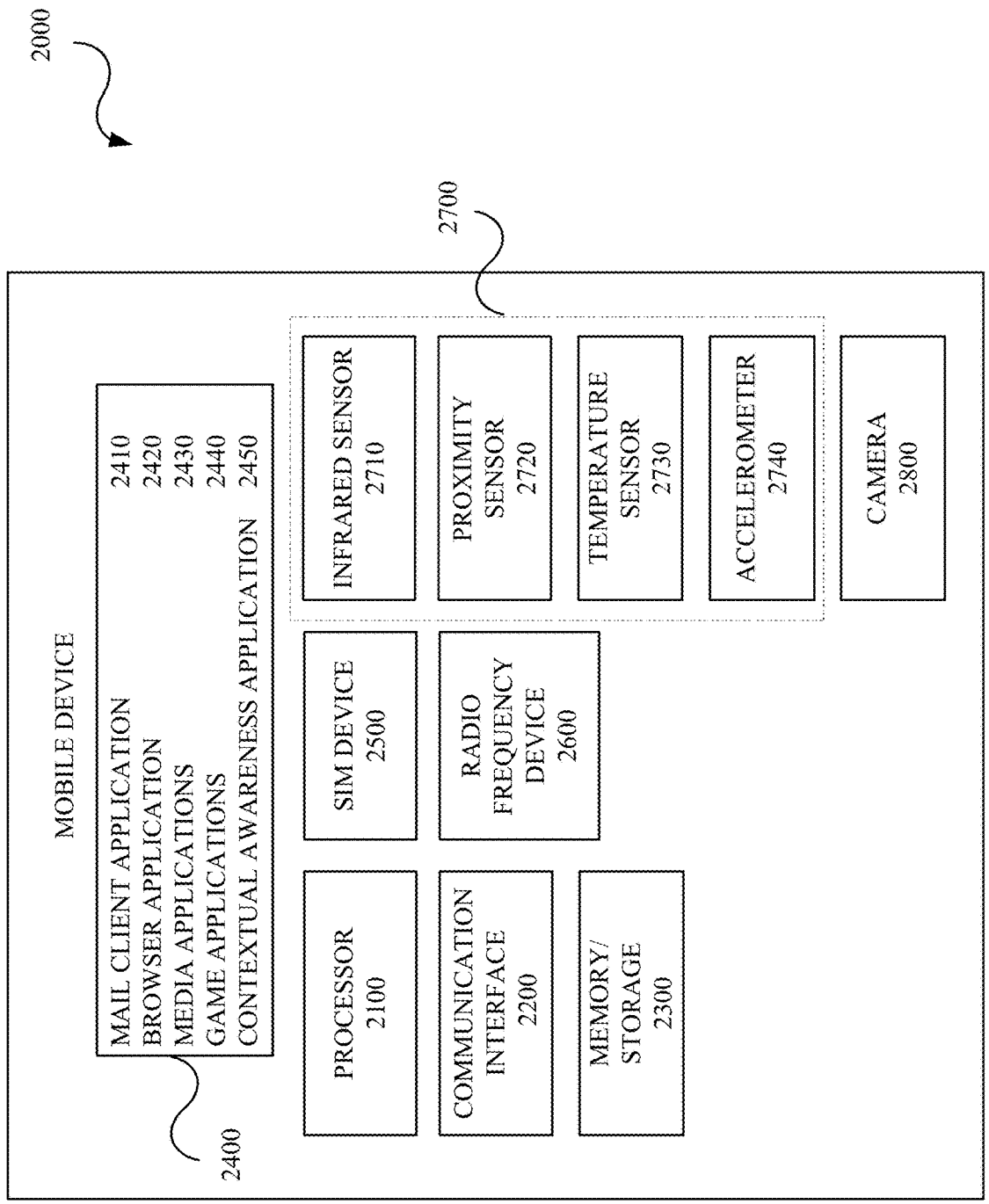
FIG. 2 is a block diagram of an example of a mobile device in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and devices for determining contextual awareness for a mobile device and adjusting settings based on the contextual awareness determination. In implementations, the mobile device can include a contextual awareness application which accesses non-intrusive sensors on the mobile device to determine the environmental context for the mobile device. For example, the environmental context can be an indoor environment, an outdoor environment, a stadium-type environment, a theatre-type environment, and the like. Each of these environmental contexts can have different environmental characteristics, metrics, and the like which can be measured by the non-intrusive sensors and used by the mobile device to determine a present environmental context. In implementations, the non-intrusive sensors can be a proximity sensor, an infrared sensor, a temperature sensor, an accelerometer, and the like. In implementations, the non-intrusive sensors can be sensors which do not obtain mobile device specific or identifying data. The contextual awareness application can then make decisions regarding mobile device settings in view of the determined environmental context. In implementations, the contextual awareness application runs in the background on the mobile device. Privacy concerns are mitigated or eliminated as location information is not determined or needed to determine the environmental context. For example, GPS tracking system information is not required.

In implementations, an indoor environment can be determined from the environment having a constant temperature range due to artificial temperature regulation and stationary infrared patterns due to the mobile device sitting on a desk and the like. In implementations, an outdoor environment can be determined from the environment having a fluctuating temperature range due to direct sun, shade wind, and other conditions and constantly shifting or moving infrared patterns due to the user moving with the mobile device. In implementations, a stadium-type environment can be determined from the environment having a constant temperature range due to body heat from multiple surrounding people and constantly shifting or moving infrared patterns due to the user moving with the mobile device. In implementations, the stadium-type environment determination can be supplemented or confirmed by transmitting data packets over available wireless networks to determine throughput and latency due to large numbers of users of the wireless network. The large number of users can cause reduced latency, due to scheduling delays for user traffic, which will slow down user experience on mobile data applications.

In implementations, the contextual awareness application can optimize wireless network connectivity based on the environmental context determination. For example, the mobile device can interact better with certain wireless networks based on the environmental context. In the indoor environment, macro-cellular wireless networks are generally inferior to Wi-Fi wireless networks. In implementations, the contextual awareness application can turn off the macro-cellular wireless network radio in the mobile device to save battery power. In implementations, the contextual awareness application can prioritize usage of the Wi-Fi wireless network over the macro-cellular wireless network to enhance user experience and mobile device speed. In the outdoor environment, the macro-cellular wireless networks are generally better than the Wi-Fi networks and the contextual awareness application can adjust the mobile device settings accordingly. In the stadium-type environment or the theater-type environment, the contextual awareness application can enable the mobile device to transmit packet data to determine optimum wireless connection and adjust the mobile device settings accordingly.

In implementations, the contextual awareness application can implement defined actions or tasks based on the environmental context determination. In implementations, the contextual awareness application can turn off or close an application based on the determined environmental context. For example, the application can be running in the background and is not applicable for the determined environmental context. In implementations, the contextual awareness application can turn off or close an application based on length of use of the application for a given environmental context. In implementations, the contextual awareness application can turn off or close an application based on time of day for a given environmental context.

FIGS. 1A, 1B, and 1C are diagrams of examples of different environments for use of a mobile device 1000 in accordance with embodiments of this disclosure. FIG. 1A is an indoor environment 1100 such as a house 1125 where a user 1150 is working at a desk 1175 and placed the mobile device 1000 on the desk 1175. FIG. 1B is an outdoor environment 1200 where a user 1250 is running or walking outside carrying the mobile device 1000. FIG. 1C is a stadium-type environment 1300 where a user 1325 has the mobile phone 1000 and is watching an event surrounded by people 1375. In each case, the mobile device can be connected to or be in communication with (collectively "connected to") one or more wireless networks 1125 and 1175, where the one or more wireless networks 1125 and 1175 can be a cellular network, a WiFi network, and the like. The environments are illustrative and other environments can be used without departing from the scope of the specification and claims herein.

FIG. 2 is a block diagram of an example of a mobile device 2000 in accordance with implementations of this disclosure. The mobile device 2000 can be, but is not limited to, end user devices, cellular telephones, Internet Protocol (IP) devices, mobile computers, laptops, handheld computers, PDAs, personal media devices, smartphones, notebooks, notepads, phablets and the like. The mobile device 2000 can include, but is not limited to, a processor 2100, a memory/storage 2200, a communication interface 2300, applications 2400, a subscriber identity module or subscriber identification module (SIM) 2500, a radio frequency (RF) device 2600, a non-intrusive sensor 2700, and a camera 2800. Sensor data from the non-intrusive sensor 2700 and image data from the camera 2800 can be collectively referred to as sensor data.

In implementations, the RF device 2600 can include multiple RF devices, a dual frequency RF device, or combinations thereof to enable RF communications via a cellular network, a Wi-Fi network, or combinations thereof. In each instance, a RF device can include, but is not limited to, a transmitter, receiver, antenna, radio, and the like which is applicable and appropriate for the cellular network, the Wi-Fi network, or combinations thereof.

In implementations, the applications 2400 can include, but is not limited to, a mail client application 2410, a web browser application 2420, media applications 2430, game applications 2440, and a contextual awareness application 2450, and the like. In implementations, the contextual awareness application 2450 can be provisioned, preinstalled, or preloaded on the mobile device 2000. In implementations, the contextual awareness application 2450 can be pushed to the mobile device 2000 as part of provisioning of the mobile device 2000.

In implementations, the non-intrusive sensor 2700 can include, but is not limited to, one or more of an infrared sensor 2710, a proximity sensor 2720, a temperature sensor, 2730, an accelerometer 2740, and like non-intrusive sensors. In an implementation, the memory/storage 2300 may store the techniques or methods for determining contextual awareness for the mobile device 2000 and adjusting the settings of the mobile device 2000 based on the contextual awareness determination as described herein and executed by the contextual awareness application 2450 and the processor 2100 in cooperation with the memory/storage 2200, the communications interface 2300, the applications 2400, the radio frequency device 2600, the SIM 2500, the non-intrusive sensor 2700, and the camera 2800, as appropriate.

The mobile device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Operationally, the contextual awareness application 2450 can run in the background without user interaction. User privacy will not be intruded upon or will be minimized as the contextual awareness application 2450 does not determine exact location of the mobile device 2000 or user. The contextual awareness application 2450 determines the context or nature of the environment that the mobile phone 2000 or the user and the mobile phone 2000 is in to optimize the performance of the mobile device 2000 and provide improved user experience. The contextual awareness application 2450 can determine the environmental context for different environments by obtaining information from the non-intrusive sensor 2700, the camera 2800, or combinations thereof. In implementations, the environmental context can be determined by using one or more of the described methods.

In implementations, an indoor environment can be determined by using sensor data from the accelerometer 2740. In an indoor environment, the mobile device 2000 is usually in a stationary position, e.g., sitting on a desk, in the user's pocket, or in the user's hand. The net acceleration is therefore zero as either velocity is zero or velocity is constant. The accelerometer 2740 can be used to determine acceleration data. The contextual awareness application 2450 can then determine the environmental context from the acceleration data.

In implementations, the indoor environment can be determined by using sensor data from a temperature sensor 2730, if available. In an indoor environment, the mobile device 2000 is usually in a regulated or controlled environment where the temperature is nearly constant or fluctuates nominally. The temperature sensor 2730 can be used to measure the temperature. The contextual awareness application 2450 can then determine the environmental context from fluctuations or lack of fluctuations in the temperature measurements. A temperature range can be defined with a defined range or variance based on the temperature measurements.

In implementations, the indoor environment can be determined by using sensor data from an infrared sensor 2710 or proximity sensor 2720, if available. In an indoor environment, the mobile device 2000 is usually in a stationary position, e.g., sitting on a desk, in the user's pocket, or in the user's hand. The infrared sensor 2710 or proximity sensor 2720 can be used to determine the infrared patterns with respect to the mobile device 2000. The contextual awareness application 2450 can then determine the environmental context from detection of stationary infrared patterns.

In implementations, the indoor environment can be determined by comparing an image taken by a user with the camera 2800 with a database of tagged or categorized images to determine the environmental context.

In implementations, the mobile device 2000 and/or the contextual awareness application 2450, solely or cooperatively can take actions with respect to a determination of an indoors environmental context.

In implementations, the mobile device 2000 and/or the contextual awareness application 2450, solely or cooperatively can prioritize searching for Wi-Fi network connections as opposed to cellular network connections since most indoor locations such as, but not limited to, offices, indoor malls or shopping centers, and residences have private or public Wi-Fi hotspots available. During this time, a cellular-based RF device or radio, for example, can be placed in idle mode and used for incoming and/or outgoing voice calls. The Wi-Fi network can be used for all data connections or communications.

In implementations, the mobile device 2000 and/or the contextual awareness application 2450, solely or cooperatively can pause, stop, or disable designated or certain applications. For example, web browsing, video streaming, and social media are applications that a majority of users use indoors. Applications outside these categories which are left open by the user accidentally can be closed to save battery life. In implementations, the certain applications can be designated by the user, be a default set of applications, be based on historical usage, or combinations thereof.

In implementations, the mobile device 2000 and/or the contextual awareness application 2450, solely or cooperatively can control the brightness level of the screen of the mobile device 200 using the ambient light sensor data to save battery power.

In implementations, the mobile device 2000 and/or the contextual awareness application 2450, solely or cooperatively can monitor the usage of streaming or gaming applications on the mobile device 2000. The data can be used to determine if the usage period is greater than a threshold based on a historical average, a defined or default threshold, a time of day threshold, or combinations thereof. In this instance, the streaming or gaming applications can be closed which are in violation of the threshold. For example, such a situation can arise if a party other than the user was using the mobile device 2000 to watch programs or play games all day.

In implementations, an outdoor environment can be determined by using sensor data from the accelerometer 2740, the temperature sensor 2730, the infrared sensor 2710, and/or the proximity sensor 2720, and image data from the camera 2800. In an outdoor environment, the mobile device 2000 can be in a location such as a park, a parking lot, a moving car, and the like. Different types of sensor data and/or image data can be used in different combinations to account for the different types of outdoor environments. For example, if the user is outside and walking around, then the temperatures measured by the temperature sensor 2730 can vary or fluctuate if the user is in the sunshine, if the user is in the shade, if there is cloud coverage, if it is windy, and the like. Moreover, the measurements made by the infrared sensor 2710 and/or the proximity sensor 2720 can show moving heat or infrared patterns where people are moving relative to the user. For example, if the user is traveling in a car, then the measurements made by the accelerometer 2740 will indicate a net acceleration due to the velocity changes. Similar to the indoor environment determination, image data can be used when the user has taken images which can be compared against tagged images in a database.

In implementations, the mobile device 2000 and/or the contextual awareness application 2450, solely or cooperatively can take actions with respect to a determination of an outdoors environmental context.

In implementations, the mobile device 2000 and/or the contextual awareness application 2450, solely or cooperatively can prioritize searching for cellular network connections as opposed to Wi-Fi network connections since Wi-Fi hotspots or connections have limited range and have limited use outdoors. Consequently, battery power can be saved by disabling the Wi-Fi RF device or radio to stop searching and attempting to connect to unusable Wi-Fi hotspots. The cellular network can be used for voice and data communications.

In implementations, the mobile device 2000 and/or the contextual awareness application 2450, solely or cooperatively can pause, stop, or disable designated or certain applications. For example, navigation applications, camera applications, social media applications, streaming applications, and the like are applications that a majority of users use outdoors. Applications outside these categories which are left open by the user accidentally can be closed to save battery life. In implementations, the certain applications can be designated by the user, be a default set of applications, be based on historical usage, or combinations thereof.

In implementations, the mobile device 2000 and/or the contextual awareness application 2450, solely or cooperatively can control or optimize the brightness level of the screen of the mobile device 200 using the ambient light sensor data to save battery power.

In implementations, a stadium-type, theatre-type or like venue-type environment can be determined by using sensor data from the accelerometer 2740, the temperature sensor 2730, the infrared sensor 2710, and/or the proximity sensor 2720, and image data from the camera 2800. Different types of sensor data and/or image data can be used in different combinations to determine the venue-type environment. For example, the temperatures measured by the temperature sensor 2730 can remain constant even in outdoor open stadiums since the body heat irradiated by the large presence of individuals regulates the temperature. Moreover, the measurements made by the infrared sensor 2710 and/or the proximity sensor 2720 can show moving heat or infrared patterns where people are moving relative to the user. Moreover, the measurements made by the accelerometer 2740 will indicate a zero acceleration.

In implementations, the mobile device 2000 and/or the contextual awareness application 2450, solely or cooperatively can take actions with respect to a determination of an outdoors environmental context.

In implementations, the mobile device 2000 and/or the contextual awareness application 2450, solely or cooperatively can measure throughput and latency at the mobile device 2000 by sending data packets using different RF devices or radios, such as the Wi-Fi RF device and/or radio or the cellular RF device and/or radio, and measure the round trip or response time. In implementations, the mobile device 2000 can try to download and/or upload files similar to a speed test application over different the different RF devices or radios to see which RF device or radio performs best. Accordingly, the optimum RF device or radio for throughput, loading, and/or latency can be chosen for the venue-type environment.

In implementations described herein, the sensor data can be image data captured by a user using the camera 2800. In this instance, a database can be populated with images tagged by location data provided by the GPS tracking system when the GPS tracking system is active or connected and/or the user has not disabled the GPS tracking system. In implementations, the database can be stored in the memory/storage 2300. In addition, the images can also be tagged with sensor data from the non-intrusive sensor 2700. Consequently, when images are taken when the GPS tracking system is unavailable, the contextual awareness application 2450 can determine the environmental context using a later captured image by comparing the image against the database.

In implementations, the contextual awareness application 2450 can use the image database to assist the user when the GPS tracking system is unavailable. For example, if the user is in a location without the GPS tracking system, the contextual awareness application 2450 can prompt the user, via text or audio, whether the user is lost. If the user indicates that they are lost, the contextual awareness application 2450 can prompt the user to take an image of the current environment. This image can be compared with the image database to determine a potential location. The potential location in addition to a compass on the mobile device 2000 can provide the user an idea of where they are in and what direction the last known location is.

In implementations, the contextual awareness application 2450 can use the image database to assist the user when the GPS tracking system is unavailable. For example, if the user is in a location without the GPS tracking system, the contextual awareness application 2450 can prompt the user, via text or audio, whether the user needs assistance. If the user indicates that they need assistance, the contextual awareness application 2450 can prompt the user to take an image of the current environment. This image can be compared with the image database to determine a potential match. The potential match can then trigger a reminder to perform a task associated with the image, such as, for example, grocery shopping, picking up a prescription, and the like.

Figure 3:
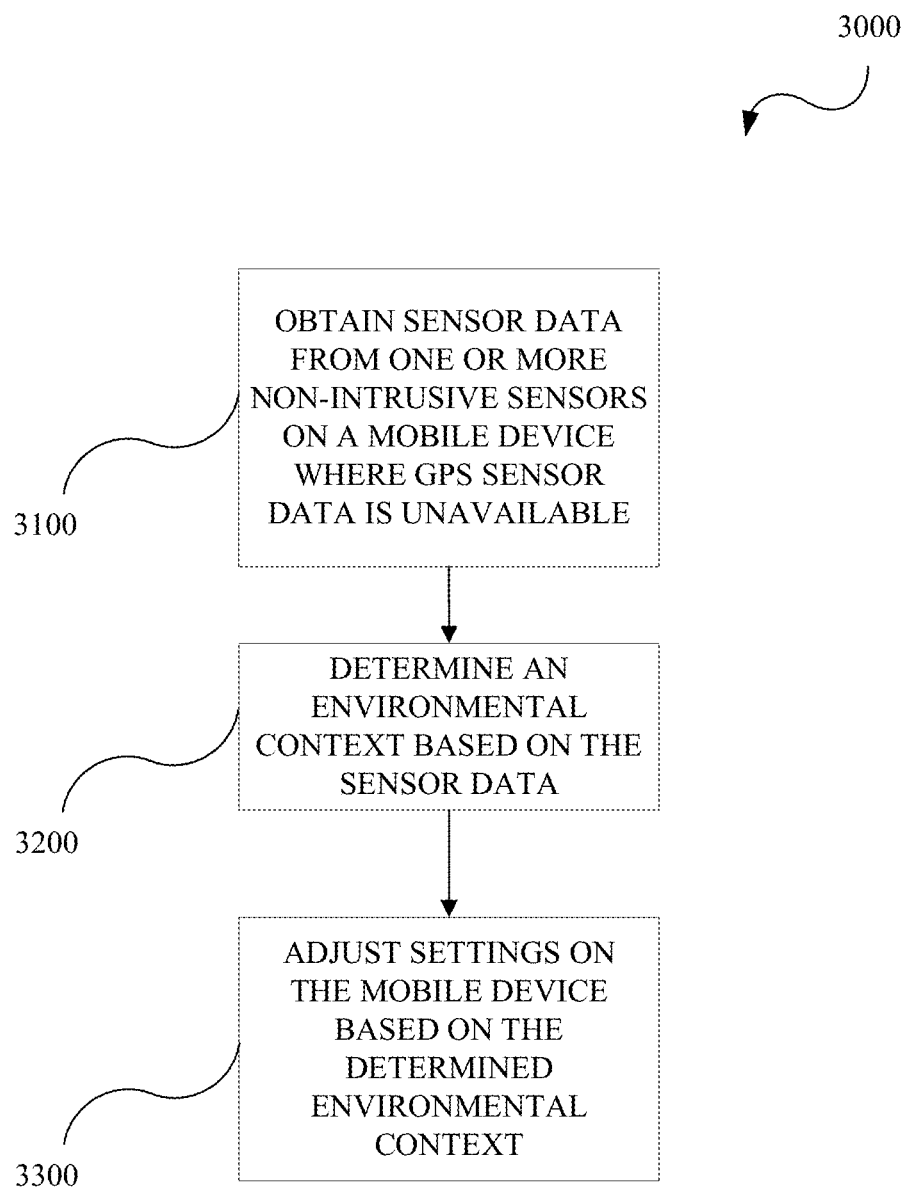
FIG. 3 is a flowchart of an example method for context awareness determination in accordance with embodiments of this disclosure.

FIG. 3 is a flowchart of an example method 3000 for context awareness determination in accordance with embodiments of this disclosure. The method 3000 includes: obtaining 3100 sensor data from one or more non-intrusive sensors on a mobile device where GPS sensor data is unavailable; determining 3200 an environmental context based on the sensor data; and adjusting 3300 settings on the mobile device based on the determined environmental context. For example, the technique 3000 may be implemented, as applicable and appropriate, by the mobile device 2000 of FIG. 1 and one or more of the components or entities located in the mobile device 2000.

The method 3000 includes obtaining 3100 sensor data from one or more non-intrusive sensors on a mobile device where GPS data is unavailable. GPS units on mobile devices can become unavailable due to connectivity issues or for user privacy concerns. For example, users can turn off the GPS or location function. Mobile devices can include non-intrusive sensors which obtain one or more sensor data readings or measurements. The sensor data can be used by an environmental context application to determine the environmental context of the mobile device. The determination can be done without the use of GPS sensor data. These sensors can include, but are not limited, to accelerometers, infrared sensors, proximity sensors, cameras, temperature sensors, and the like. A determination of the environmental context does not intrude upon user privacy as an exact location is not determined.

The method 3000 includes determining 3200 an environmental context based on the sensor data. The multiple sensor data readings or measurements by each sensor can be used to determine the environmental context. For example, if the temperature sensor reads the same temperature within a defined range then the environmental context can be set as an indoor environmental context. For example, if the accelerometer determines a net zero acceleration then the environmental context can be set as an indoor environmental context. For example, if the infrared sensor or proximity sensor shows constant infrared patterns then the environmental context can be set as an indoor environmental context. For example, an image taken by the user can be compared against a database of tagged images or environmental context indexed images to determine the environmental context. In contrast, fluctuating temperature measurements, a net acceleration, or moving infrared patterns can indicate an outdoor environmental context. Combinations of the sensor data, including one or more sensor data readings, from multiple non-intrusive sensors can be used to determine other environmental contexts. For example, moving infrared patterns with near constant temperature readings can indicate a venue-type environmental context. For example, a net acceleration with near constant temperature readings can indicate that the user is riding in a vehicle. In implementations, criteria for different environmental contexts can be stored on the mobile device. The multiple sensor data can be analyzed to determine if the sensor data readings are constant, non-stationary, fluctuating, moving, and the like (collectively "sensor data attribute"), where the sensor data attribute depends on a sensor type. One or more of the sensor data attribute(s) can be used to determine the environmental context. The sensor data, including one or more sensor data readings, from multiple non-intrusive sensors can be used to confirm the environmental context.

The method 3000 includes adjusting 3300 settings on the mobile device based on the determined environmental context. Battery power conservation, parental control review, connection optimization, or other actions can be taken which are dependent on the determined environmental context. For example, to conserve battery power, a wireless network connection can be set to idle, mobile device application(s) can be stopped, mobile device screen brightness adjusted, and like settings can be tuned to the environmental context. For example, if the environmental context is determined to indoors and certain mobile device applications are running excessively (based on previous usage, for example), it can be an indication that someone other than the user is using the mobile device. In this instance, the mobile device can close the mobile device application.

In general, a method for determining an environmental context for a mobile device includes capturing, by one or more non-intrusive sensors on a mobile device, sensor data associated with the one or more non-intrusive sensors, wherein global positioning system sensor data is unavailable, generating, by the mobile device, a sensor data attribute from each captured sensor data, determining, by the mobile device, an environmental context for the mobile device from the sensor data attribute, and adjusting, by the mobile device, settings on the mobile device based on the determined environmental context. In implementations, where the adjusting further includes placing, by the mobile device, one of a cellular RF device or a Wi-Fi RF device in an idle mode based on the determined environmental context. In implementations, where the adjusting further includes closing, by the mobile device, mobile device applications based on the determined environmental context. In implementations, where the adjusting further includes adjusting, by the mobile device, a display brightness control of the mobile device based on the determined environmental context. In implementations, where the sensor data attribute is any of fluctuating temperatures, constant temperature, moving infrared patterns, constant infrared pattern, net acceleration, or zero acceleration. In implementations, where when the one or more non-intrusive sensors is a camera, the sensor data is an image, and the determining further includes comparing, by the mobile device, the image against a database based of indexed images to determine the environmental context. In implementations, the method further includes prompting, by the mobile device, a user of an event based on the image. In implementations, the method further includes populating, by the mobile device, the database with images taken by a user and indexing accordingly when the global positioning system sensor data is available. In implementations, where the method the determining further includes analyzing, by the mobile device, the sensor data attribute from each captured sensor data to determine the environmental context. In implementations, where the environmental context is one of at least an indoor environmental context, an outdoor environmental context, or a venue-type environmental. In implementations, when the determined environmental context is a venue-type, the adjusting further includes transmitting, by the mobile device, data packets over a first wireless network, transmitting, by the mobile device, data packets over a second wireless network, selecting, by the mobile device, one of the first wireless network or the second wireless network based on minimization of latency and maximization of throughput, and placing, by the mobile device, a remaining one of the first wireless network or the second wireless network in an idle mode.

In general, a mobile device includes sensors configured to capture data, where a global positioning system sensor is inactive, a memory configured to store a contextual awareness application, and a processor connected to the sensors and to the memory to execute the contextual awareness application, the processor and the contextual awareness application configured to obtain the data from the sensors, determine data profile for the data, use the data profile to determine a contextual scene for the mobile device, and configure the mobile device based on the determined contextual scene. In implementations, where the processor and the contextual awareness application further configured to set one of a cellular RF radio or a Wi-Fi radio in an idle mode based on the determined contextual scene. In implementations, where the processor and the contextual awareness application further configured to close applications running on the mobile device based on the determined contextual scene. In implementations, where the processor and the contextual awareness application further configured to set a display of the mobile device based on the determined contextual scene. In implementations, where the processor and the contextual awareness application further configured to use multiple data profiles to confirm the determined contextual scene. In implementations, where the processor and the contextual awareness application further configured to use multiple data profiles in collaboration to determine the contextual scene. In implementations, where a camera is one of the sensors and the data is an image, the processor and the contextual awareness application further configured to use an image database to determine the contextual scene for the image. In implementations, where the image database is populated with tagged images when the global positioning system sensor is available. In implementations, where the processor and the contextual awareness application further configured to determine cellular latency and throughput for a cellular RF radio, determine Wi-Fi latency and throughput for a Wi-Fi radio, and set one of the cellular RF radio or the Wi-Fi radio in an idle mode based on which one of the cellular latency and throughput or the Wi-Fi latency and throughput optimizes user experience.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for determining an environmental context for a mobile device, the method comprising:
   capturing, by one or more non-intrusive sensors on a mobile device, sensor data associated with the one or more non-intrusive sensors, wherein global positioning system sensor data is unavailable;
   generating, by the mobile device, a sensor data attribute from each captured sensor data;
   determining, by the mobile device, an environmental context of where the mobile device is from the sensor data attribute; and
   adjusting, by the mobile device, settings on the mobile device based on the determined environmental context, wherein the determining comprises:
   determining an indoor environment from constant temperature measurements and non-fluctuating infrared patterns;
   determining an outdoor environment from fluctuating temperature measurements and fluctuating infrared patterns; and
   determining a venue-type environment from constant temperature measurements and fluctuating infrared measurements.

2. The method of claim 1, wherein the adjusting further comprising:
   placing, by the mobile device, one of a cellular RF device or a Wi-Fi RF device in an idle mode based on the determined environmental context.

3. The method of claim 2, wherein the adjusting further comprising:
   closing, by the mobile device, mobile device applications based on the determined environmental context.

4. The method of claim 3, wherein the adjusting further comprising:
   adjusting, by the mobile device, a display brightness control of the mobile device based on the determined environmental context.

5. The method of claim 4, wherein the sensor data includes fluctuating temperatures, constant temperature, moving infrared patterns, constant infrared pattern, net acceleration, or zero acceleration.

6. The method of claim 4, wherein when the one or more non-intrusive sensors is a camera, the sensor data is an image, and the determining further comprising:
   comparing, by the mobile device, the image against a database based of indexed images to determine the environmental context.

7. The method of claim 6, further comprising:
   prompting, by the mobile device, a user of an event based on the image.

8. The method of claim 7, further comprising:
   populating, by the mobile device, the database with images taken by a user and indexing accordingly when the global positioning system sensor data is available.

9. The method of claim 1, wherein the determining further comprising:
   analyzing, by the mobile device, the sensor data attribute from each captured sensor data to determine the environmental context.

10. The method of claim 1, wherein when the determined environmental context is the venue-type, the adjusting further comprising:
    transmitting, by the mobile device, data packets over a first wireless network;
    transmitting, by the mobile device, data packets over a second wireless network;
    selecting, by the mobile device, one of the first wireless network or the second wireless network based on minimization of latency and maximization of throughput; and
    placing, by the mobile device, a remaining one of the first wireless network or the second wireless network in an idle mode.

11. A mobile device comprising:
    sensors configured to capture data, wherein a global positioning system sensor is inactive;
    a memory configured to store a contextual awareness application; and
    a processor connected to the sensors and to the memory to execute the contextual awareness application, the processor and the contextual awareness application configured to:
    obtain the data from the sensors;
    determine data profile for the data;
    use the data profile to determine a contextual scene for the mobile device, wherein the determined contextual scene is an indoor environment when constant temperature measurements and non-fluctuating infrared patterns are present, the determined contextual scene is an outdoor environment when fluctuating temperature measurements and fluctuating infrared patterns are present, and the determined contextual scene is a venue-type environment when constant temperature measurements and fluctuating infrared measurements are present; and
    configure the mobile device based on the determined contextual scene.

12. The mobile device of claim 11, wherein the processor and the contextual awareness application further configured to:
  set one of a cellular RF radio or a Wi-Fi radio in an idle mode based on the determined contextual scene.

13. The mobile device of claim 12, wherein the processor and the contextual awareness application further configured to:
  close applications running on the mobile device based on the determined contextual scene.

14. The mobile device of claim 13, wherein the processor and the contextual awareness application further configured to:
  set a display of the mobile device based on the determined contextual scene.

15. The mobile device of claim 14, wherein the processor and the contextual awareness application further configured to:
  use multiple data profiles to confirm the determined contextual scene.

16. The mobile device of claim 14, wherein the processor and the contextual awareness application further configured to:
  use multiple data profiles in collaboration to determine the contextual scene.

17. The mobile device of claim 16, wherein a camera is one of the sensors and the data is an image, the processor and the contextual awareness application further configured to:
  use an image database to determine the contextual scene for the image.

18. The mobile device of claim 17, wherein the image database is populated with tagged images when the global positioning system sensor is available.

19. The mobile device of claim 16, wherein the processor and the contextual awareness application further configured to:
  determine cellular latency and throughput for a cellular RF radio;
  determine Wi-Fi latency and throughput for a Wi-Fi radio; and
  set one of the cellular RF radio or the Wi-Fi radio in an idle mode based on which one of the cellular latency and throughput or the Wi-Fi latency and throughput optimizes user experience.

* * * * *